United States Patent [19]

Pavlak et al.

[11] 4,386,752
[45] Jun. 7, 1983

[54] HINGED COLLAR CLIP

[75] Inventors: John J. Pavlak, Youngstown; Robert G. Plyler, Vienna, both of Ohio

[73] Assignee: General Motors Corporation, Detroit, Mich.

[21] Appl. No.: 243,520

[22] Filed: Mar. 13, 1981

[51] Int. Cl.³ .............................................. F16L 3/08
[52] U.S. Cl. .................................. 248/73; 24/249 R; 248/74 A; 248/74 PB
[58] Field of Search ............... 248/73, 74 PB, 68 CB, 248/74 R, 74 A, 74 B, 68 R, 316 B, 316 D; 24/16 PB, 16 R, 249 R, 255 SL, 256, 257 R, 263 R; 16/225; 403/11

[56] References Cited

U.S. PATENT DOCUMENTS

| 3,494,072 | 2/1970 | Olson | 24/255 SL |
| 3,847,331 | 11/1974 | Vallinoto et al. | 24/257 SL |
| 3,954,238 | 5/1976 | Nivet | 248/68 CB |
| 4,183,120 | 1/1980 | Thorne | 24/16 R |
| 4,220,301 | 9/1980 | Jacobs et al. | 24/257 X |
| 4,317,262 | 3/1982 | Wells | 248/74 R |

Primary Examiner—William H. Schultz
Assistant Examiner—Ramon O. Ramirez
Attorney, Agent, or Firm—F. J. Fodale

[57] ABSTRACT

A collar clip retains a corrugated conduit and fastens it to a panel. The collar clip comprises a pair of sections connected at one end by an integral flexible hinge, a safety catch at the hinge end of the sections, and a latch at the hinge-remote end of the sections. The safety catch and latch are each alone capable of holding the sections together in an enclosed position around the conduit in the event the hinge fractures.

5 Claims, 6 Drawing Figures

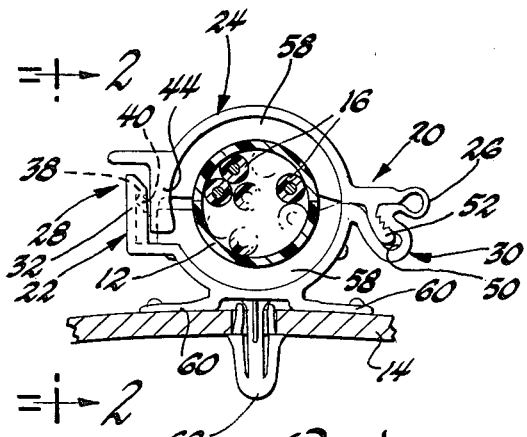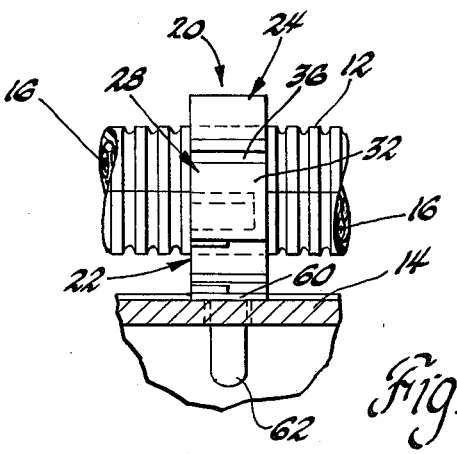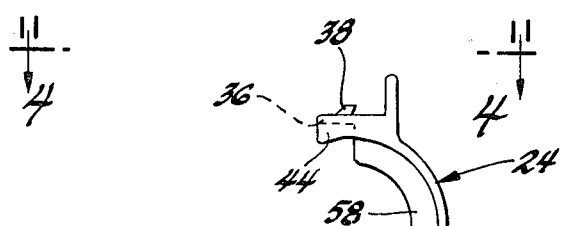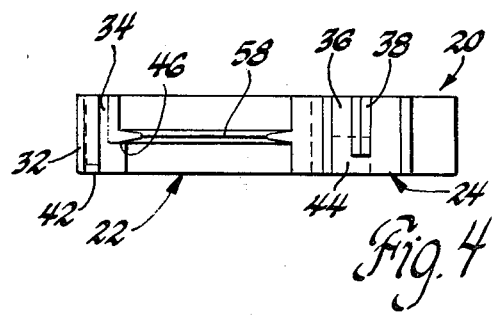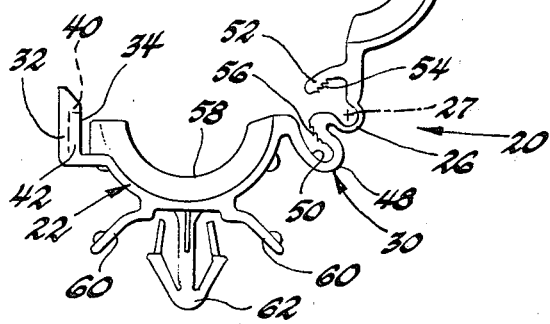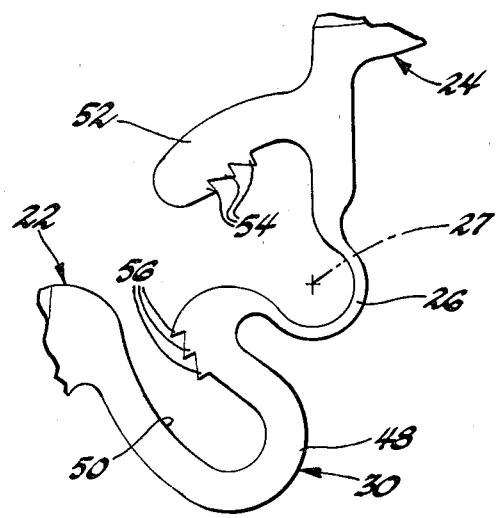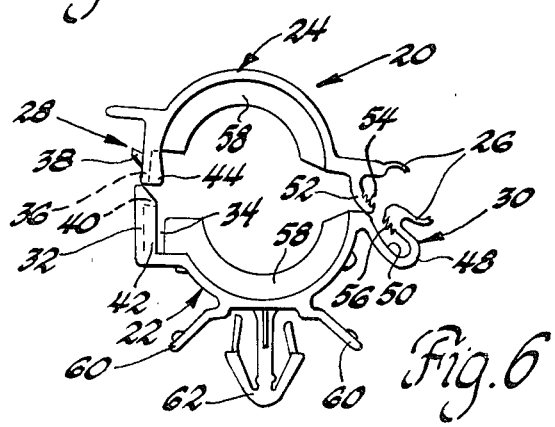

HINGED COLLAR CLIP

This invention relates generally to clips for retaining elongated elements such as electric wires, tubes, conduits or pipes and, more particularly, to collar clips which comprise a pair of hinged sections which are enclosed about an elongated element or elements to retain the same.

U.S. Pat. No. 3,954,238 granted to Andre Nivet on May 4, 1976 discloses several collar clips comprising a pair of hinged sections which are enclosed about an elongated element to retain or secure the same. All of the clips have cooperating latch parts at the hinge-remote ends of the sections to hold these ends together after enclosure. The clips shown in FIGS. 3, 4 and 7 also have a safety catch near the hinge to hold the hinge ends together in the event the hinge fractures. In the clips shown in FIGS. 3 and 7, the safety catch is an arcuate tongue on one section which engages in an arcuate recess in the other section. In the clip of FIG. 4, the safety catch takes the form of cooperating shoulders 9a and 9b.

The object of this invention is to provide an improved collar clip of the type shown in the aforesaid patent, particularly the embodiments shown in FIGS. 3 and 7 which have a safety catch in the form of an arcuate tongue and cooperating recess.

A feature of the invention is that the safety catch and latch are each capable of holding the clip sections together independently of the other in the event that both the hinge and either the safety catch or latch fail.

Another feature of the invention is that the safety catch comprises an arcuate tongue which positively engages in an arcuate socket so that the safety catch alone is sufficient to hold the clip sections together.

Another feature of the invention is that the arcuate tongue positively engages in a number of positions in the socket so that diameter variations of the retained element or elements can be accommodated.

Another feature of the invention is that the arcuate tongue and socket of the safety catch are resilient enough to allow snap assembly of the clip sections when the hinge has failed.

Another feature of the invention is that the latch at the hinge-remote ends of the sections comprises a tongue and slot arrangement which alone is sufficient to hold the clip sections together.

Yet another feature of the invention is that the tongue and slot arrangement of the latch prevents relative movement of the clip sections in the transverse direction.

Yet another feature of the invention is that the tongue and slot arrangement prevents relative movement of the clip sections in the axial direction.

Still yet another feature is that the collar clip is designed for easy molding.

Other objects and features of the invention will become apparent to those skilled in the art as the disclosure is made in the following detailed description of a preferred embodiment of the invention as illustrated in the accompanying sheet of drawing in which:

FIG. 1 is a front view of an assembly which includes a collar clip in accordance with our invention.

FIG. 2 is a side view of the assembly taken along the line 2—2 of FIG. 1.

FIG. 3 is a front view of the collar clip shown in FIG. 1 illustrating the collar clip in a fully open position.

FIG. 4 is a top view of the collar clip shown in FIG. 3.

FIG. 5 is an enlargement of a portion of FIG. 3 showing the hinge and safety catch detail.

FIG. 6 is a front view of the collar clip showing the collar clip sections positioned for assembly when the hinge is fractured.

Referring now to the drawing, FIGS. 1 and 2 show a collar clip 20 of this invention in a typical automotive wiring application wherein the collar clip 20 retains conduit 12 and fastens it to a panel 14. The conduit 12 is a plastic, flexible, corrugated tube which is axially slit throughout its length and it is well-known in the automotive wiring art as a means for housing a plurality of electrical leads 16.

The collar clip 20 itself comprises a pair of sections 22 and 24 which are connected together by an integral flexible hinge 26 which permits relative movement of the sections about an imaginary hinge axis 27 between a fully open position shown in FIG. 3 and a closed position shown in FIG. 1.

The collar clip has a latch 28 at the hinge-remote ends of the sections 22 and 24 and a safety catch 30 at the hinge ends of the sections. The latch 28 and the safety catch 30 are both constructed so that the sections 22 and 24 can be secured together in the event the hinge 26 fractures.

The latch 28 comprises a resilient latch arm 32 which is attached adjacent the hinge-remote end of section 22 so that it forms a slot 34 which is parallel to the hinge axis 27. The latch further comprises a tongue 36 at the hinge-remote end of the section 24 which is received in the slot 34 when the collar clip 20 is closed as shown in FIG. 1. The collar clip 20 is held in the closed position at the hinge-remote end by an outward projection or nib 38 of the tongue 36 which snaps behind an inward projection or hook 40 at the end of the resilient latch arm 32.

The latch 28 also stablizes the hinge-remote ends of the sections 22 and 24 in the axial direction, this is in the direction of the hinge axis 27.

The stablizing means takes the form of a wing 42 at an axial end of the latch arm 32 which engages the axial end of the foreshortened nib 38 and a wing 44 at a corresponding axial end of the tongue 36 which engages a stop intermediate the axial ends of the section 22.

The safety catch 30 comprises a U-shaped member 48 at the hinged end of the section 22 which forms a resilient arcuate socket 50. The safety catch 26 also comprises an arcuate tongue 52 at the hinged end of section 24 which fits into the arcuate socket 50 when the collar clip 20 is closed as shown in FIG. 1. The tongue 52 has three ratchet teeth 54 on the side toward the hinge axis 27 and the outer leg of the U-shaped member 48 has a cooperating set of three ratchet teeth 56.

The collar clip 20 is molded in the open position shown in FIGS. 3, 4 and 5 and it should be noted that the conduit clip 20 is shaped for easy molding particularly in the hinge and safety catch detail which are consistently shaped in the axial direction.

During normal operation, the collar clip 20 is enclosed about the conduit 12 by pivoting the sections 22 and 24 toward each other about the axis 27 from the open position shown in FIG. 3 to the closed position shown in FIG. 1. During this movement, tongue 52 enters socket 50 and the teeth 54,56 ratchet past each other until all three teeth engage their counterparts on the opposite member. The tongue 52 is thus positively engaged in the socket 50.

The tongue 36 also enters the slot 34 until the nib 38 snaps behind the hook 40. Thus, in the closed position shown in FIGS. 1 and 2, the sections 22 and 24 are held together by the latch 28 and the safety catch 30 and each functions independently of the other. That is, the latch 28 alone will hold the sections 22 and 24 together if both the safety catch 30 and the hinge 26 fail and vice versa. The latch 28 has such an ability primarily because the tonue 36 is trapped laterally in the slot 34.

The safety catch 30 alone also holds the sections 22 and 24 together if both the latch 28 and the hinge 26 fail. This is because the tongue 52 is positively retained in the socket 50. In this regard, it should also be noted that the tongue 52 can be positively retained in several positions, i.e., with one, two or three ratchet teeth engaging. Consequently, slightly larger diameter or bulged conduits can be accommodated with the safety catch 30 adjusting at the ratchet teeth for the increased size. It is preferable, however, that at least two pairs of ratchet teeth 54,56 engage.

In the event that the hinge 26 breaks before the sections 22 and 24 are assembled, the sections may be snap assembled together. This is illustrated in FIG. 6 which shows the sections 22 and 24 positioned for snap assembly when the hinge is broken. When the sections 22 and 24 are pushed together from this position, the resilient latch arm 32 and the resilient socket 50 allow the respective tongues 36 and 52 to snap into the positions shown in FIG. 1.

The collar clip 20 is shown as retaining a corrugated conduit 16 and, consequently, the sections 22 and 24 each have a central rib 58 for engaging in one of the corrugations of the conduit 16. The section 22 is also illustrated as having a particular panel mounting feature in the form of pressure feet 60 and a self-expanding head 62 which engage opposite sides of the panel 14. The central ribs 58 and the particular panel mounting arrangement 60,62 are not, per se, a part of our invention. The collar clip 20 can obviously be adapted for use with an elongated element or elements of non-corrugated shape and the collar clip 20 can likewise obviously have other mounting arrangements or none at all.

In other words, we wish it to be understood that we do not desire to be limited to the exact details of construction shown and described, for obvious modifications will occur to a person skilled in the art.

The embodiments of the invention in which an exclusive property or privilege is claimed are defined as follows:

1. A collar clip for retaining an elongated element or elements comprising:
   a pair of sections connected at one end by an integral flexible hinge so that the sections are relatively moveable about a hinge axis between an open and a closed position,
   a safety catch at the one end of the sections connected by the flexible hinge,
   said safety catch comprising a resilient arcuate socket attached to one of the sections and an arcuate tongue which is attached to the other of the sections and is positively engaged in the arcuate socket when the sections are in a closed position, and
   a latch at the opposite end of the sections for retaining the sections in the closed position.

2. A collar clip for retaining an elongated element or elements comprising:
   a pair of sections connected at one end by an integral flexible hinge so that the sections are relatively moveable about a hinge axis between an open and a closed position,
   a safety catch at the one end of the sections connected by the flexible hinge,
   said safety catch comprising a resilient arcuate socket attached to one of the sections and an arcuate tongue attached to the other of the sections,
   said socket and said tongue having cooperating ratchet teeth for positively engaging the tongue in the socket when the sections are in a closed position, and
   a latch at the opposite end of the sections for retaining the sections in the closed position.

3. The collar clip as defined in claim 2 wherein the cooperating ratchet teeth positively engage the tongue in the socket in several positions to accommodate diameter variation of the retained element or elements.

4. A collar clip for retaining an elongated element or elements comprising:
   a pair of sections connected at one end by an integral flexible hinge so that the sections are relatively moveable about a hinge axis between an open and a closed position,
   a safety catch at the one end of the sections connected by the flexible hinge,
   said safety catch comprising a resilient arcuate socket attached to one of the sections and an arcuate tongue which is attached to the other of the sections and positively engaged in the arcuate socket when the sections are in the closed position, and
   a latch at the opposite end of the sections for retaining the sections in the closed position,
   said latch comprising a latch arm which is attached to one of the sections and forms a slot at the hinge-remote end of the one section, and a tongue which is attached to the other of the sections and retained in the slot by the latch arm when the sections are in the closed position,
   said safety catch and said latch each alone being capable of holding the sections together in the closed position in the event the hinge fractures.

5. A collar clip for retaining an elongated element or elements comprising:
   a pair of sections connected at one end by an integral flexible hinge so that the sections are relatively moveable about a hinge axis between an open and a closed position,
   a safety catch at the one end of the sections connected by the flexible hinge,
   said safety catch comprising a resilient arcuate socket formed by a U-shaped member between the one end of one of the members and the hinge, and an arcuate tongue which is attached to the other of the sections, and positively engaged in the arcuate socket when the sections are in a closed position, and
   a latch at the opposite end of the sections for retaining the sections in the closed position,
   said latch comprising a flexible latch arm which is attached to one of the sections and which forms a slot at the hinge-remote end of the one section which is parallel to the hinge axis,
   said latch further comprising a tongue at the hinge-remote end of the other of the sections and which is parallel to the hinge axis retained in the slot by cooperating projections of the latch arm and the tongue when the sections are in the closed position,
   said safety catch and said latch each alone being capable of holding the sections together in the closed position in the event the hinge fractures.

* * * * *